United States Patent [19] [11] 3,886,445
Chiba et al. [45] May 27, 1975

[54] METHOD AND APPARATUS FOR ELECTROMAGNETIC DETECTION OF WELDS IN METAL STRIPS INCLUDING PRESSING MEANS FOR THE STRIP

[75] Inventors: Iwane Chiba, Fukuyama; Toshihiro Mori, Yokohama; Noboru Yamazaki, Fukuyama, all of Japan

[73] Assignee: Nippon Kokan Kabushiki Kaisha, Tokyo, Japan

[22] Filed: Oct. 17, 1973

[21] Appl. No.: 407,108

[52] U.S. Cl. ............... 324/37; 33/147 L; 73/159; 340/258
[51] Int. Cl. ............................................. G01r 33/12
[58] Field of Search ......... 324/37, 40, 34 TK, 34 H; 340/259; 33/147 L, 148 H; 73/159

[56] References Cited
UNITED STATES PATENTS

| | | | |
|---|---|---|---|
| 1,880,802 | 10/1932 | Chilson | 324/34 TK |
| 2,051,780 | 8/1936 | Brown | 324/34 TK |
| 2,058,518 | 10/1936 | Schuster | 324/34 TK |
| 2,438,506 | 3/1948 | Ladrach | 324/34 TK |
| 2,719,953 | 10/1955 | Waldie | 324/37 |
| 3,469,182 | 9/1969 | Wycherly et al. | 324/37 |
| 3,619,769 | 11/1971 | Kusenberger | 324/37 |

Primary Examiner—Robert J. Corcoran
Attorney, Agent, or Firm—Flynn & Frishauf

[57] ABSTRACT

A method and apparatus for detecting the welds in a metal strip in which a long strip of metal produced by welding a number of metal strips together is passed, on its way to the next processing section, through a set of bridle rolls around which the metal strip is wound tightly and formed into good shape, and a plurality of sensors for detecting the welds in the metal strip are supported, together with at least one roller, on a holder. The roller is pressed against the strip tightly held on the bridle roll to accurately maintain a predetermined gap between the surface of the strip and the sensors and thereby to detect the passage of the welds in the strip with greater accuracy.

14 Claims, 9 Drawing Figures

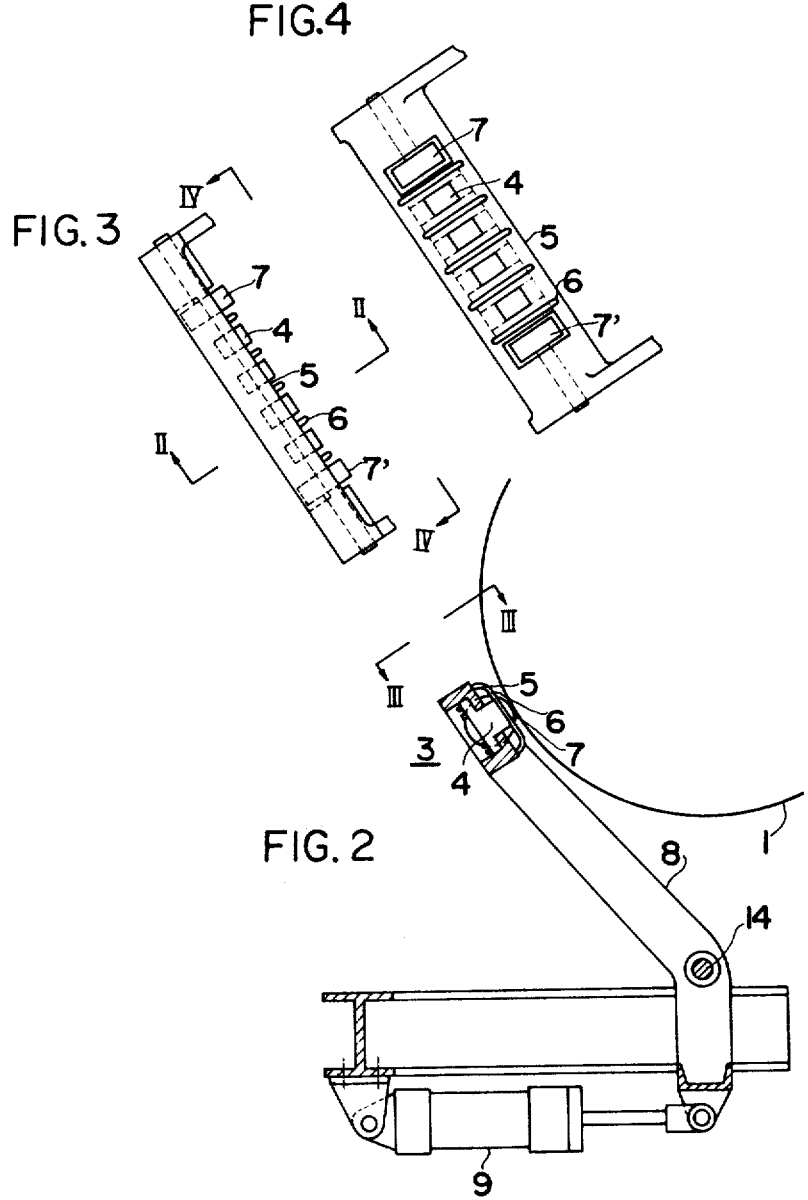

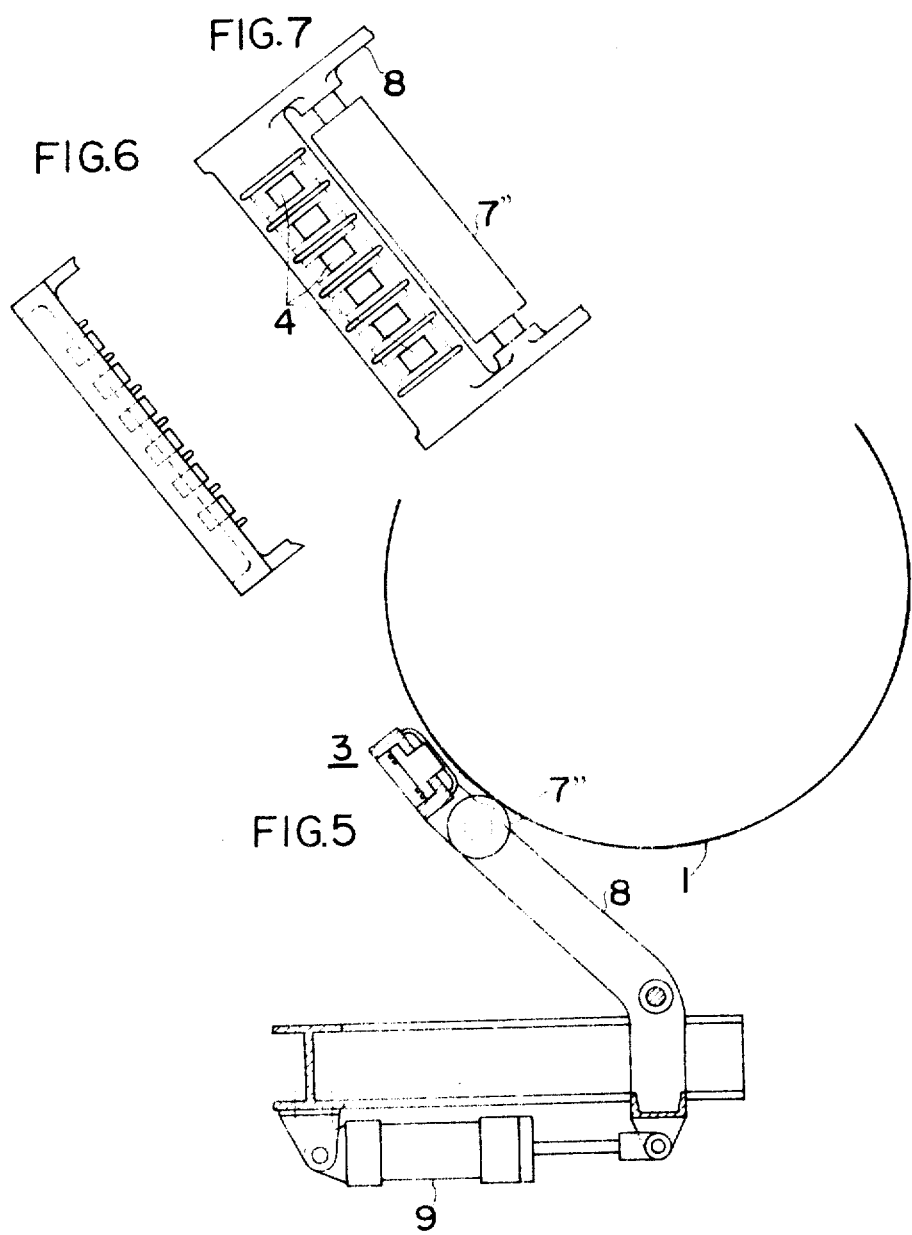

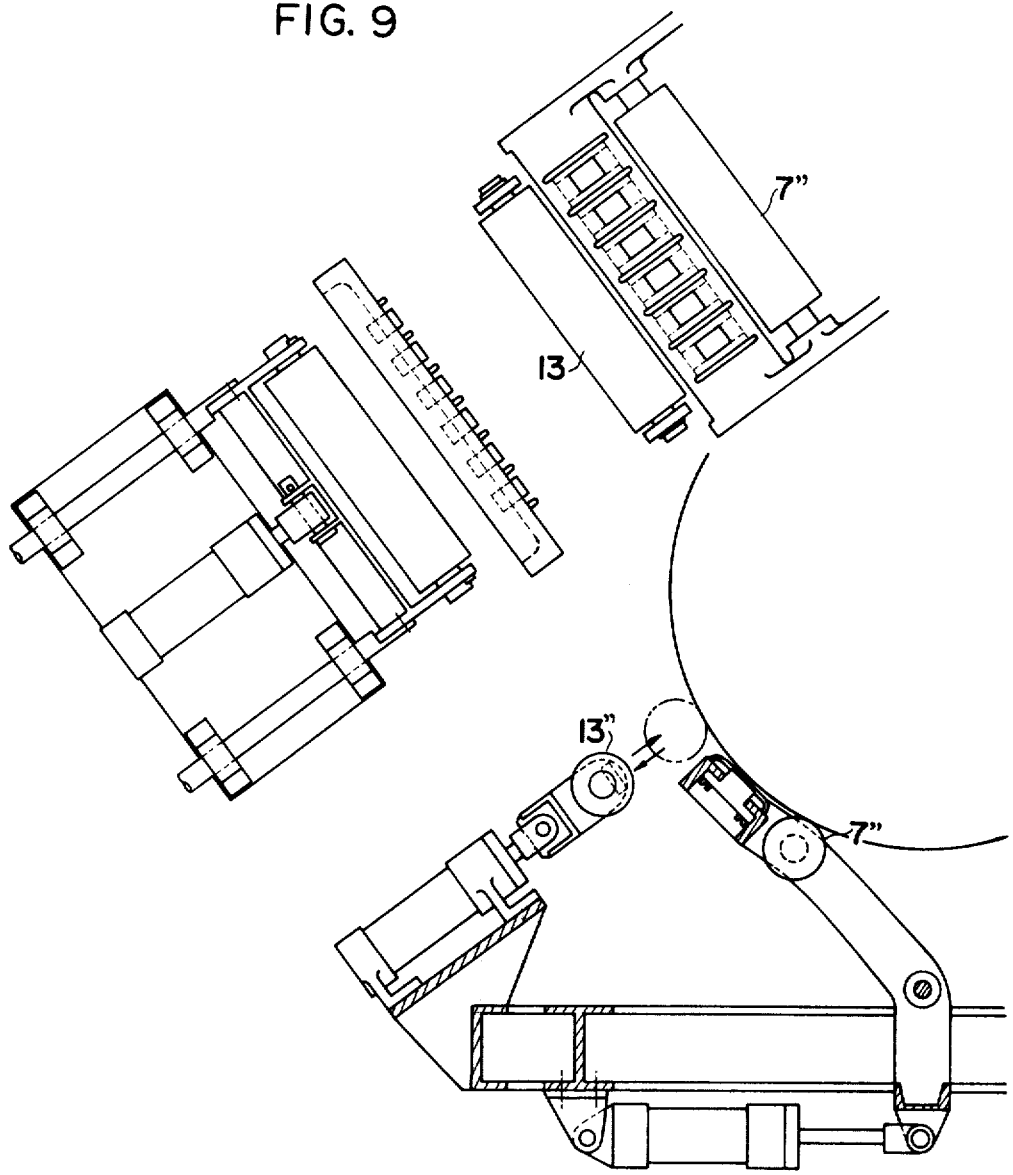

METHOD AND APPARATUS FOR ELECTROMAGNETIC DETECTION OF WELDS IN METAL STRIPS INCLUDING PRESSING MEANS FOR THE STRIP

BACKGROUND OF THE INVENTION

The present invention relates to methods and apparatus for detecting the welds in a metal strip.

With the conventional methods and apparatus for this type of detection, it has been customary to punch holes or make suitable marks on the welds of a strip so that the punched holes or marks are detected by means of, for example, photoelectric tubes. While the present inventors have seen no concrete examples of methods which detect the welds in a strip by means of electromagnetic induction without using any punched holes or marks on the welds, it is assumed that a person skilled in the art may arrive at such methods. In such electromagnetic induction methods, it would be customary to arrange a sensor or sensors along the horizontal passline of a strip. In this case, it is conceivable that the strip tends to bounce vertically across its correct passline, thus giving rise to incorrect detection.

Therefore, the present invention is directed to a new and novel method and apparatus which utilizes an electromagnetic induction method for detecting the welds in a metal strip. More particularly, it is directed to the measures designed for preventing the bouncing of strip at the detecting position, accurately maintaining a predetermined gap between the sensors and the strip and preventing damage to the sensors caused by breaking of the strip or the like as well as another measure designed to tightly place the strip around a set of bridle rolls.

SUMMARY OF THE INVENTION

It is an object of the present invention to provide a novel method and apparatus for detecting the welds in a metal strip, wherein a set of bridle rolls is provided in the pass-line of a metal strip in such a manner that the strip is delivered through the bridle rolls for the next processing operation, whereby when the strip is passed through the bridle rolls, a slight tension is produced on the strip to tightly hold it against the surface of the bridle rolls with the result that the strip is prevented from bouncing in this position and a good shape or good flatness is produced in the strip with the resultant improvement in the accuracy of detection of the welds.

It is another object of the present invention to provide such novel method and apparatus, wherein a plurality of sensors and two rollers provided on both sides of the row of the sensors are supported on a holder, whereby when the rollers are pressed against the surface of the strip held tightly against the bridle roll, a predetermined gap is maintained between the strip surface and the sensors, thereby always ensuring a predetermined strip surface to sensor gap with the resultant improvement in the accuracy of detection of the welds by means of the electromagnetic induction method.

It is still another object of the present invention to provide such novel method and apparatus, wherein the sensor holder is provided with a plurality of protector elements and the pusher mechanism is provided with a push and pull function, thereby preventing the occurrence of damage to the sensors due to breaking of the strip or the like.

It is still another object of the present invention to provide such novel method and apparatus, wherein a separately provided second pusher mechanism is employed to press at least one roller against the strip placed on the bridle roll in the vicinity of the sensors, thereby more tightly holding the strip against the bridle roll with the resultant improvement in the accuracy of detection.

BRIEF DESCRIPTION OF THE DRAWING

FIG. 2 is a side view of the detector of FIG. 1 as viewed in the direction of the arrows at the section II—II of FIG. 3;

FIG. 3 is a side view of FIG. 2 viewed in the direction of the arrows III—III;

FIG. 4 is a plan view of FIG. 3 viewed in the direction of the arrows IV—IV;

FIGS. 5, 6 and 7 show a modification of the detector of FIGS. 2, 3 and 4, which is based on the same concept;

FIG. 9 is a modification of the embodiment of FIGS. 5, 6 and 7, wherein only one additional pressure roller is employed.

DESCRIPTION OF THE PREFERRED EMBODIMENTS

Figure 1:
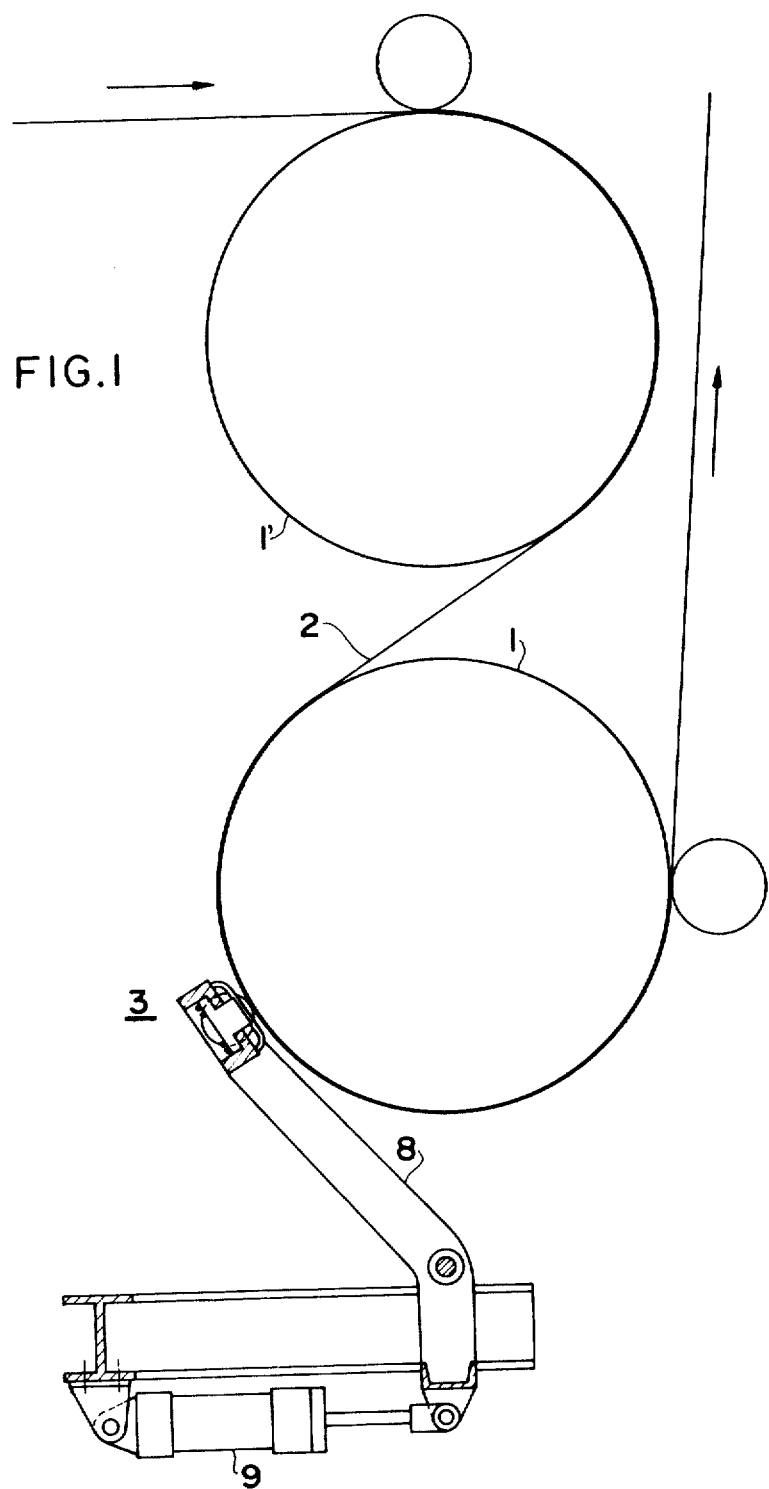
FIG. 1 schematically shows the manner in which a detector is positioned in place with respect to its associated bridle roll.

In the drawings, numerals 1 and 1' designate bridle rolls. As shown in FIG. 1, a metal strip 2 is moved under tension in the direction of the arrows. A detector 3 is located near the position where the strip 2 is held tightly against the bridle roll 1.

As shown in FIGS. 2, 3 and 4, the electromagnetic induction type detector 3 comprises a plurality of sensors 4 arranged in the direction of the width of the metal strip 2 and rollers 7 and 7' are provided on both ends of the row of the sensors 4. Each of the rollers 7 and 7' has an axis of rotation extending perpendicular to the direction of movement of the metal strip 2 and their bearings are mounted, along with the sensors 4, in a holder 5. The function of the rollers 7 and 7' is to maintain a predetermined gap between the surface of the strip 2 and the sensors 4 when said rollers 7 and 7' are pressed against the surface of the strip. Each of the sensors 4 is protected by projecting armlike protector elements 6 provided on both sides thereof. The sensors 4, the rollers 7 and 7' and the protector elements 6 are mounted on the holder 5. The holder 5 is fixedly mounted on one end of a holder arm 8. The holder arm 8 is hinged at an intermediate portion thereof by a hinge pin 14 and the other end of the arm 8 is connected to a pusher mechanism such as a cylinder-piston mechanism 9 having a push-pull function, so that the rollers 7 and 7' are pressed against or separated from the surface of the strip 2 in accordance with the operation of the cylinder-piston mechanism 9.

The embodiment shown in FIGS. 5, 6 and 7 is based on the same concept as the above-described first embodiment, but differs in that a roller 7'' is arranged adjacent to the row of the sensors 4. The axis of rotation of roller 7'' extends perpendicular to the direction of movement of the strip 2. The roller 7'' may be positioned on either side of the row of sensors 4 with respect to the direction of movement of the strip.

Figure 8:
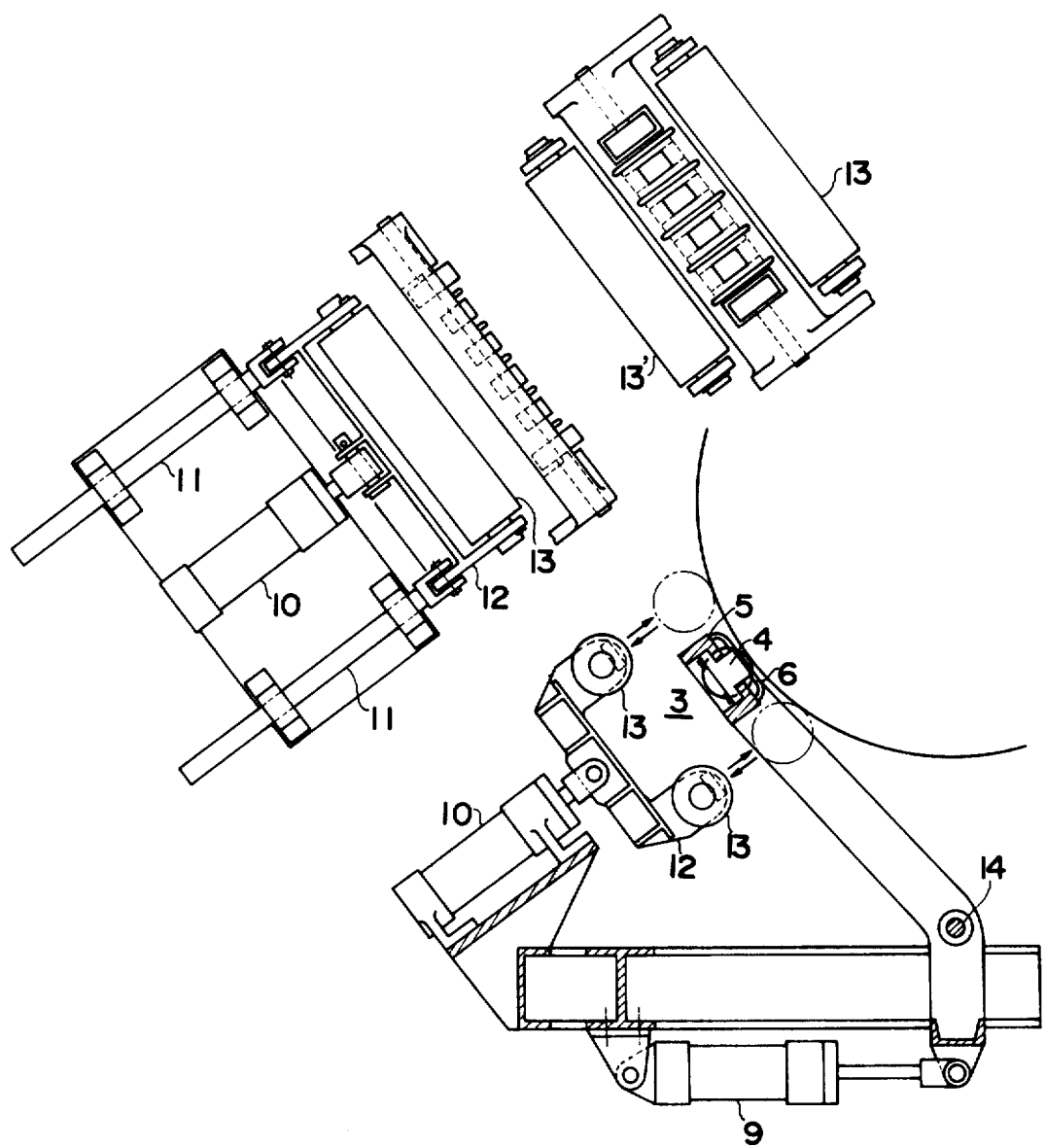
FIG. 8 is a schematic diagram of still another embodiment of this invention, in which two additional rollers each having an axis parallel to that of the bridle roll are arranged with a space therebetween in the direction of movement of the strip and adjacent to the row of the sensors in the detector shown in FIGS. 2, 3 and 4, whereby another pusher mechanism causes the additional rollers to further press and hold the strip tightly against the bridle roll.

The embodiment of FIG. 8 differs from the embodiment shown in FIGS. 2, 3 and 4 in that two rollers 13 and 13' each having an axis parallel to that of the bridle roll and carried on a parallel motion frame 12 are urged against the bridle roll by a cylinder-piston mechanism 10 and guide rods 11 to further urge and hold the strip 2 tightly against the bridle roll, with the detector 3 comprising the sensors 4, the projecting holder 5, the protector elements 6 and the rollers 7 and 7' being placed between the rollers 13 and 13'. With this construction, it is possible to compensate for any change in the degree of contact between the strip 2 and the bridle roll due to a slight variation in the strip tension.

FIG. 9 shows still another embodiment of the invention which is based on the same principle, but differs from the embodiment of FIGS. 5, 6 and 7 in that a pressure roller 13'' is provided on that side of the row of the sensors where the roller 7'' is not mounted to press the strip 2 against the bridle roll. In this way, the same effect as the embodiment of FIG. 8 can be expected.

The cylinder-piston mechanism 9 for the detector 3 and the cylinder-piston mechanism 10 for the rollers 13, 13' and 13'' comprise double acting cylinder units so that during the breaking or looping of the strip 2 or when the strip 2 is held against the bridle roll or separated therefrom, the detector 3 or the rollers 13 and 13'' may be readily moved from their operating positions.

The mounting of the sensors 4 on the holder 5 may be effected from the outside where there are no protector elements 6 and they are preferably mounted on the holder 5 by means of machine screws. The maintenance, inspection or replacement of the sensors 4 may be readily effected in their operating positions at any time as occasions demand.

While the preferred embodiments of the present invention have been described so far, the resulting advantages of this invention may be summarized as follows:

(1) Due to the fact that the strip 2 is wound under slight tension on the bridle rolls 1 and 1', even if the strip shape is not good, the shape of the strip 2 can be made quite similar to the surface condition of the bridle roll with the resultant improvement in the strip shape and the elimination of the surface irregularities, thereby preventing any detection error due to an inferior strip shape. 2. By virtue of the action of the rollers 7 and 7' or 7'' mounted on the holder 5 along with the sensors 4 and pressed against the surface of the strip 2 by the cylinder-piston mechanism 9 through the holder arm 8, a predetermined gap can be positively maintained between the sensors 4 and the surface of the strip 2. Further, this predetermined gap can always be ensured independently of the thickness of the strip 2.

3. The detector 3 is satisfactorily protected against damage due to breaking or looping of the strip 2 or caused at the time of placement and replacement of the strip 2.

4. By virtue of the use of an additional pusher mechanism, any slight variation in the degree of contact between the strip and the bridle roll due to a change in the tension produced on the strip, may be compensated for by the action of the pressure rollers 13 and 13' or 13'' with the resultant improvement in the accuracy of detection.

5. Maintenance and replacement of the sensors 4 is easy.

What we claim is:

1. A method of detecting the welds in a metal strip comprising the steps of:

tightly winding a moving metal strip comprised of shorter metal strips welded together around a set of bridle rolls for detecting the welds in said metal strip, locating a detector of the non-contact electromagnetic induction type in the vicinity of said metal strip wound on a bridle roll, said detector including a holder member extending in the direction of the width of the strip and having a plurality of sensors fixedly mounted on said holder member in a row in the direction of the width of the strip, a plurality of protector elements projecting from said holder member adjacent said sensors, and at least one roller rotatably mounted to said holder member in the vicinity of said sensors and projecting from said holder member past the outermost surface of said sensors which face said strip, pressing said at least one roller against the surface of said strip on said bridle roll for maintaining a substantially constant predetermined gap between said plurality of sensors and the surface of said metal strip and maintaining said sensors in a fixed position for electromagnetic detection of said welds, and selectively separating said sensors away from said surface of said metal strip to cease said detection of welds.

2. A method according to claim 1, wherein said at least one roller includes plural rollers having an axis of rotation extending in the direction of the width of said metal strip and are rotatably mounted to said holder member adjacent to each end of said row of sensors, said rollers being pressed against the surface of said metal strip on said bridle roll so as to maintain said substantially constant predetermined gap between said surface of said metal strip and said sensors.

3. A method according to claim 1, wherein said at least one roller has an axis of rotation extending in the direction of the width of said metal strip and is rotatably carried by said holder member adjacent and parallel to said row of sensors, said roller being pressed against the surface of said metal strip on said bridle roll so as to maintain said substantially constant predetermined gap between said surface of said metal strip and said sensors.

4. A method according to claim 1, wherein said holder member is mounted on one end of a holder arm, one end of said holder arm being hinged by a pin at an intermediate portion thereof, comprising selectively pushing and pulling the other end of said holder arm mechanism to selectively engage and disengage said detector with said surface of said metal strip at the detecting position.

5. A method according to claim 1, comprising pressing at least one additional roller having an axis of rotation extending parallel to that of said bridle roll against the surface of said metal strip in the vicinity of said row of sensors by means of a cylinder-piston mechanism having a plurality of guide rods so as to tightly wind said metal strip on said bridle roll.

6. A method according to claim 1, comprising winding said metal strip around the bridle rolls at more than half the circumference of said bridle rolls.

7. Apparatus for detecting the welds in a long strip of metal produced by welding a plurality of shorter metal strips together, said apparatus comprising:
- a set of bridle rolls around which said strip is wound;
- a non-contact type detector including a holder member having a plurality of electromagnetic induction type sensors fixedly mounted thereon, said sensors being spaced from said strip and arranged in a row in the direction of the width of the strip, at least one roller rotatably mounted adjacent said sensors with its axis of rotation extending in the direction of the width of the strip, said at least one roller being mounted in the vicinity of said sensors and projecting from said holder member past the outermost surface of said sensors which face the strip, and a plurality of protector elements projecting from said holder member adjacent said sensors;
- a holder arm hinged at an intermediate portion thereof and carrying said detector at one end thereof; and
- a double acting mechanism attached to the other end of said holder arm for selectively locating said detector adjacent said strip and for pressing said at least one roller against said metal strip and maintaining a substantially constant predetermined gap between the surface of said metal strip and said sensors.

8. Apparatus according to claim 7, wherein said at least one roller includes a pair of rollers and wherein said rollers are respectively rotatably carried by said holder member at a position adjacent to each end of said row of sensors, said rollers being selectively pressed against the surface of said metal strip by said double acting mechanism to maintain said predetermined gap between said sensors and said surface of said metal strip.

9. Apparatus according to claim 7, wherein said at least one roller includes an elongated roller extending in the direction of the width of the strip and wherein said elongated roller is rotatably carried by said holder arm in parallel with and adjacent to said row of sensors, said roller being selectively pressed against the surface of said metal strip by said double acting mechanism to maintain said predetermined gap between said sensors and said surface of said metal strip.

10. Apparatus according to claim 7, wherein said double acting mechanism includes a cylinder-piston mechanism.

11. Apparatus according to claim 7, wherein said holder arm is hinged at a central portion thereof by a pin, and said other end of said holder arm is connected to the piston rod of said cylinder-piston mechanism.

12. Apparatus according to claim 7, further including pusher means comprising a cylinder-piston mechanism, at least one pusher roller having an axis of rotation parallel to that of said bridle roll and being operatively coupled to said cylinder-piston mechanism, and a plurality of guide rods coupled to said pusher roller, said cylinder-piston mechanism selectively pressing said pusher roller against said metal strip to more tightly wind said metal strip on said bridle roll.

13. Apparatus according to claim 7, wherein said sensors are detachably mounted to said holder member while said sensors are in the detecting positions thereof.

14. Apparatus according to claim 7, wherein said metal strip is wound around more than one half the circumference of said bridle rolls.

* * * * *